Figure 1:
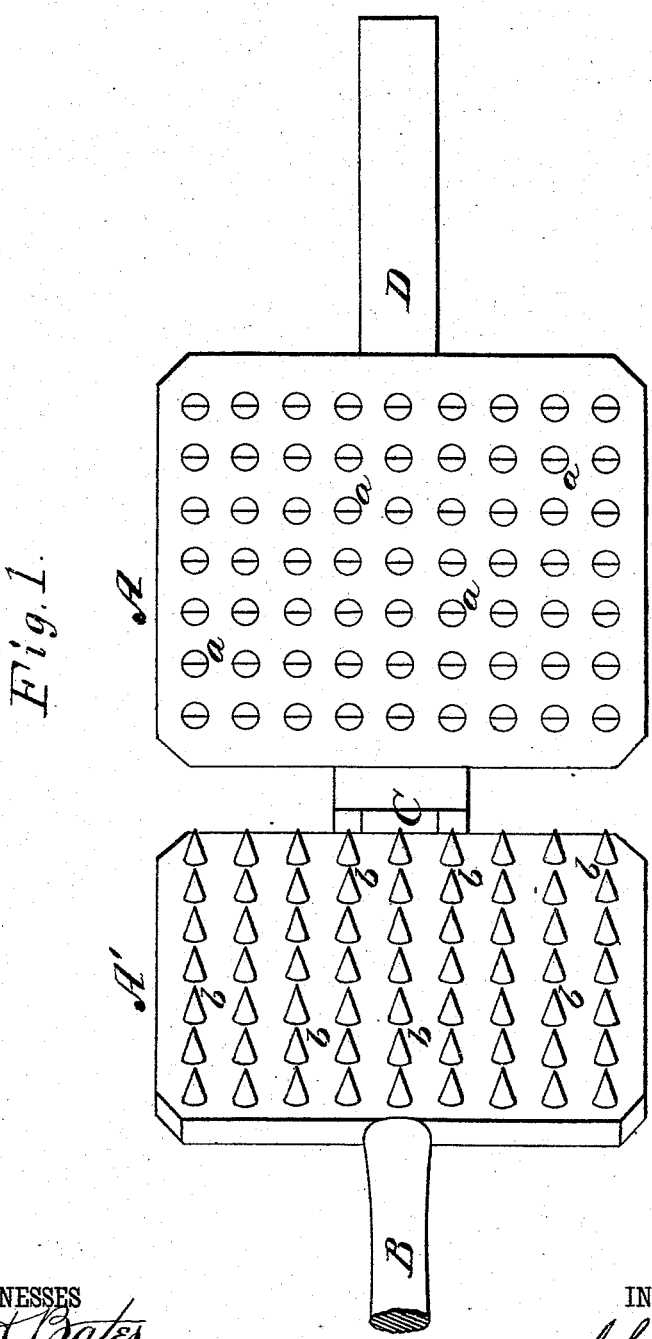

2 Sheets--Sheet 1.

J. W. JAMES.
Beef-Steak Crushers.

No. 158,280. Patented Dec. 29, 1874.

WITNESSES
E. H. Bates
Robert Everett

INVENTOR
John W. James
Chipman Hosmer & Co
Attorneys

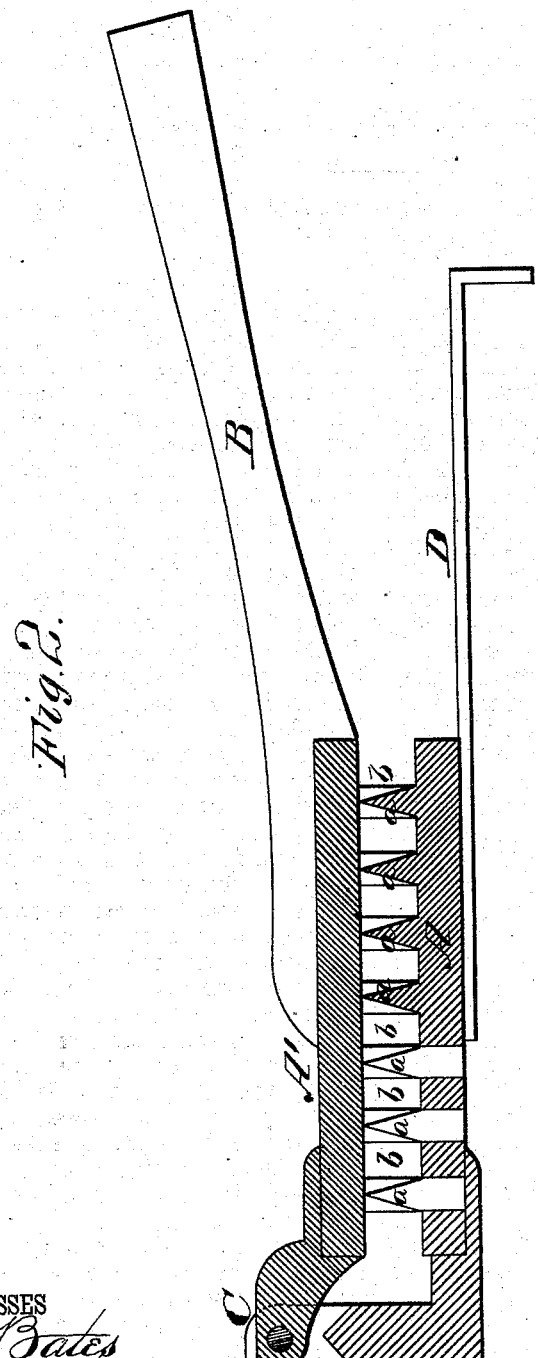

UNITED STATES PATENT OFFICE.

JOHN W. JAMES, OF CENTRE TOWN, MISSOURI.

IMPROVEMENT IN BEEFSTEAK-CRUSHERS.

Specification forming part of Letters Patent No. 158,280, dated December 29, 1874; application filed September 5, 1874.

*To all whom it may concern:*

Be it known that I, JOHN W. JAMES, of Centre Town, in the county of Cole and State of Missouri, have invented a new and valuable Improvement in Beefsteak-Crushers; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a plan view of my beefsteak-crusher. Fig. 2 is a vertical sectional view of the same.

My invention relates to devices for mangling beefsteaks and rendering them tender; and it consists in fixing into the opposed surfaces of two plates, which are hinged together and provided with a holding arm and a handle, chisel-edged cutters, so arranged that the cutting-edges on one plate are at right angles to similar cutting-edges on the other plate, whereby the fibers of the meat will be thoroughly divided and the meat rendered more tender than by any other arrangement of cutters.

In the annexed drawings, A A' designate two flat plates of any desired size, and of the same size, into the opposed surfaces of which cutters $a$ $b$ are secured. These cutters have straight or chisel edges, and they are arranged in parallel rows at regular distances apart on each plate. The cutters $a$ on the bottom plate, A, are arranged so that their straight edges are at right angles to the cutting-edges of the cutters $b$ on the upper plate, A', and these cutters $b$ work between the rows of cutters $a$. This arrangement of the cutters admirably adapts them for thoroughly mangling meat and dividing the fibers in two directions, and it also allows the cutters to be readily sharpened with a flat file. The two plates A A' are connected together by a hinge-joint, C, and the bottom plate has rigidly secured to it an arm, D, one end of which is hooked, so as to bear against the edge of a table, and thus hold the instrument in place while using it. If desired, the arm D may be provided with a clamp-screw for more securely holding it upon a table, although I do not deem such a contrivance necessary, as the simple hook will answer every purpose. The top plate, A', is provided with a handle, B, slightly inclined, so that the hand grasping it will not strike the arm D when the plate A' is forcibly brought down.

It will be seen that the plates A A' are perforated to receive the shanks of the tapering cutters $a$ $b$. By this construction the cutters can readily be inserted or removed from their bed-plate to be sharpened, or to replace a broken cutter or cutters, or worn-out ones.

I am aware that a beefsteak-mangler composed of a lower plate provided with pointed teeth, to which is hinged a similarly-formed upper plate provided with a handle, is not new, and therefore I make no claim to such invention, which merely perforates and compresses the meat, and does not mangle it, as described in my invention.

What I claim as new, and desire to secure by Letters Patent, is—

The beefsteak-mangler herein described, consisting of the perforated plates A A', hinged together and provided with the detachable cutters $a$ $a$ $b$, circular at the base and tapering to chisel-edges, those upon the upper plate being arranged at right angles with those on the lower jaw, substantially as and for the purpose set forth.

In testimony that I claim the above I have hereunto subscribed my name in the presence of two witnesses.

JOHN WILLIAMSON JAMES.

Witnesses:
SIMON CRONIN,
J. M. YOUS.